(12) United States Patent
German et al.

(10) Patent No.: US 7,807,248 B2
(45) Date of Patent: Oct. 5, 2010

(54) SOLAR CONTROL LOW-EMISSIVITY COATINGS

(75) Inventors: John R. German, Prairie du Sac, WI (US); Gary L. Pfaff, Cazenovia, WI (US)

(73) Assignee: Cardinal CG Company, Eden Prairie, MN (US)

(*) Notice: Subject to any disclaimer, the term of this patent is extended or adjusted under 35 U.S.C. 154(b) by 418 days.

(21) Appl. No.: 11/838,481

(22) Filed: Aug. 14, 2007

(65) Prior Publication Data

US 2009/0047466 A1    Feb. 19, 2009

(51) Int. Cl.
*B32B 7/00*    (2006.01)

(52) U.S. Cl. .................... 428/98; 428/220; 428/428; 428/432; 428/698

(58) Field of Classification Search .................. 428/98, 428/220

See application file for complete search history.

(56) References Cited

U.S. PATENT DOCUMENTS

| | | | |
|---|---|---|---|
| 4,166,018 A | 8/1979 | Chapin | |
| 4,790,922 A | 12/1988 | Huffer | |
| 4,847,157 A | 7/1989 | Goodman et al. | |
| 4,847,158 A | 7/1989 | Gillery | |
| 4,891,113 A | 1/1990 | Criss | |
| 4,902,581 A | 2/1990 | Criss | |
| 5,242,560 A | 9/1993 | Lingle et al. | |
| 5,377,045 A | 12/1994 | Wolfe et al. | |
| 5,552,180 A | 9/1996 | Finley et al. | |
| 5,557,462 A | 9/1996 | Hartig et al. | |
| 5,837,108 A | 11/1998 | Lingle et al. | |
| 5,938,898 A | 8/1999 | Ando et al. | |
| 5,968,637 A | 10/1999 | Baret | |
| 5,993,950 A * | 11/1999 | Novis et al. .................. 428/216 |
| 6,060,178 A | 5/2000 | Krisko | |
| 6,159,607 A | 12/2000 | Hartig et al. | |
| 6,274,244 B1 | 8/2001 | Finley et al. | |
| 6,451,182 B2 | 9/2002 | Woodard et al. | |
| 6,461,686 B1 | 10/2002 | Vanderstraeten | |
| 6,468,402 B1 | 10/2002 | Vanderstraeten | |
| 6,511,587 B2 | 1/2003 | Vanderstraeten | |
| 6,558,800 B1 | 5/2003 | Stachowiak | |
| 6,582,809 B2 | 6/2003 | Boire et al. | |
| 6,592,996 B1 | 7/2003 | Kunisada et al. | |
| 6,623,794 B2 | 9/2003 | Finley et al. | |
| 6,627,317 B2 | 9/2003 | Wang | |
| 6,652,974 B1 | 11/2003 | Krisko | |

(Continued)

FOREIGN PATENT DOCUMENTS

GB    2279365 A    1/1995

(Continued)

OTHER PUBLICATIONS

"European Search Report dated Nov. 13, 2008, in applicant's related European application," 2 pgs.

*Primary Examiner*—David R Sample
*Assistant Examiner*—Tahseen Khan
(74) *Attorney, Agent, or Firm*—Fredrikson & Byron, P.A.

(57) ABSTRACT

A substrate bearing a solar control low-emissivity coating. The solar control low-emissivity coating includes one or more dielectric absorber films. In some embodiments, the dielectric absorber film has an absorption ratio of $k_{380<\lambda<450\ nm}/k_{650<\lambda<760\ nm}$ that is less than 1.9.

34 Claims, 14 Drawing Sheets

U.S. PATENT DOCUMENTS

| | | |
|---|---|---|
| 6,689,475 B1 | 2/2004 | Lin |
| 6,692,831 B2 | 2/2004 | Stachowiak |
| 6,730,352 B2 | 5/2004 | Stachowiak |
| 6,749,941 B2 | 6/2004 | Lingle |
| 6,782,718 B2 | 8/2004 | Lingle et al. |
| 6,783,861 B2 | 8/2004 | Ebisawa et al. |
| 6,797,389 B1 | 9/2004 | Depauw |
| 6,899,953 B1 | 5/2005 | O'Shaughnessy et al. |
| 6,926,967 B2 | 8/2005 | Neuman et al. |
| 6,994,910 B2 | 2/2006 | Stachowiak |
| 7,005,190 B2 | 2/2006 | Laird |
| 7,037,577 B2 | 5/2006 | Macquart et al. |
| 7,037,588 B2 | 5/2006 | Decroupet |
| 7,056,588 B2 | 6/2006 | Neuman et al. |
| 2003/0228476 A1* | 12/2003 | Buhay et al. ............... 428/432 |
| 2005/0008852 A1* | 1/2005 | Hartig ....................... 428/336 |
| 2005/0123772 A1 | 6/2005 | Coustet et al. |
| 2005/0205416 A1* | 9/2005 | Stachowiak ............ 204/192.26 |
| 2006/0159933 A1 | 7/2006 | Disteldorf |
| 2007/0082206 A1 | 4/2007 | Hartig |

FOREIGN PATENT DOCUMENTS

| | | | |
|---|---|---|---|
| JP | 10096801 A | 4/1998 | |

* cited by examiner

SOLAR CONTROL LOW-EMISSIVITY COATINGS

FIELD OF THE INVENTION

The invention provides coatings for substrates: specifically, low-emissivity coatings with shading performance. The invention also provides methods for producing such coatings, and IG units, monolithic panes and other substrates bearing these coatings.

BACKGROUND OF THE INVENTION

Low-emissivity coatings are well known. Typically, they include one or more infrared-reflective films each between two or more transparent dielectric films. The infrared-reflective films, which are typically conductive metals such as silver, reduce the transmission of radiant heat through the coating. The transparent dielectric films are used to reduce visible reflectance and to control other coating properties, such as color.

Low-emissivity coatings can be engineered to provide desired shading properties. As is well known, the solar heat gain coefficient (SHGC) of a window is the fraction of incident solar radiation that is admitted through a window. There are a number of applications where low solar heat gain windows are of particular benefit. In warm climates, it is especially desirable to have low solar heat gain windows. For example, solar heat gain coefficients of about 0.4 and below are generally recommended for buildings in the southern United States. Further, windows that are exposed to a lot of undesirable sun benefit from having a low solar heat gain coefficient. For example, windows on the east or west side of a building tend to get a lot of sun in the morning and afternoon. For these and various other applications, the solar heat gain coefficient of a window plays a vital role in maintaining a comfortable environment within the building. Thus, it can be very beneficial to provide windows and other glazings with coatings that establish a low solar heat gain coefficient (i.e., high shading ability coatings).

A tradeoff is sometimes made in high shading ability coatings whereby the film compositions and/or thicknesses selected to achieve a low SHGC have the effect of restricting the visible reflectance to a higher level than is ideal. As a consequence, windows bearing these coatings may have a somewhat mirror-like appearance. In addition, the transmitted and reflected colors of conventional high shading ability coatings may not be ideal. For example, these coatings may exhibit hues that are more red than is desired. The chroma of these coatings may also be greater than is desired. In most cases, it is preferable to provide a coating that is as color neutral (i.e., colorless) as possible. Thus, the reflected and transmitted colors of conventional low solar heat gain coatings may be less than ideal, both in terms of hue and chroma.

It is challenging to consistently produce any low-emissivity coating that has the desirable properties described herein. Some low-emissivity coatings have been provided with thick metal blocker layers over respective silver films. These thick blocker layers are used to establish shading performance while protecting the silver films and maintaining a balance of other properties, such as color. It has been discovered, however, that transmitted and reflected colors may be somewhat difficult to control when thick metal blocker layers are used. While production can be controlled so as to yield products with good color properties, it would be desirable to provide high shading ability coatings that are particularly easy to manufacture with consistently good color properties.

Glass tempering typically involves heating the glass to elevated temperatures on the order of 680 degrees C. Low-emissivity coatings (including those with thick metal blocker layers) may change significantly during tempering. To accommodate the changes that occur during tempering, low-emissivity coatings are sometimes provided in pairs including a temperable version and a non-temperable version. In such cases, the film stack of the temperable version is different from the film stack of the non-temperable version. These coatings are designed so the temperable version, after tempering, has properties matching those of the non-temperable version.

Further, some existing temperable coatings have limitations in terms of their durability prior to tempering. While this can be managed by adopting appropriate handling and storage practices, it would be desirable to provide temperable high shading ability coatings that offer particularly good durability prior to tempering.

It would be desirable to provide a low-emissivity coating that can achieve the following features: shading performance, low visible reflectance, pleasing color characteristics (including color stability, which is described below), good durability (including good durability for non-temperable products, good durability prior to tempering for temperable products, and good durability after tempering for temperable products), and good thermal stability (e.g., in the case of temperable products).

SUMMARY OF THE INVENTION

In certain embodiments, the invention provides a transparent substrate bearing a solar control low-emissivity coating. The coating includes an innermost infrared-reflective film (preferably comprising silver) and an outermost infrared-reflective film (preferably comprising silver). In the present embodiments, a first dielectric absorber film is located between the substrate and the innermost infrared-reflective film, and a second dielectric absorber film is located further from the substrate than the outermost infrared-reflective film. In the present embodiments, the first dielectric absorber film has a neutral absorption ratio of $k_{380<\lambda<450\ nm}/k_{650<\lambda<760\ nm}$ less than 2, preferably between 0.52 and 1.9, and the second dielectric absorber film has a neutral absorption ratio of $k_{380<\lambda<450\ nm}/k_{650<\lambda<760\ nm}$ less than 2, preferably between 0.52 and 1.9.

One group of embodiments provides a transparent substrate bearing a double-type low-emissivity coating. The coating includes a first infrared-reflective film (preferably comprising silver) and a second infrared-reflective film (preferably comprising silver). The first infrared-reflective film is closer to the substrate than the second infrared-reflective film. In the present embodiment group, the coating has a middle coat between the first and second infrared-reflective films, and the middle coat consists essentially of transparent dielectric film. In the present embodiment group, a first dielectric absorber film is located between the substrate and the first infrared-reflective film, and a second dielectric absorber film is located further from the substrate than the second infrared-reflective film.

In some embodiments, the invention provides a transparent substrate bearing a triple-type low-emissivity coating. Here, the coating includes, in sequence outwardly: a first absorber film comprising nitride, a first infrared-reflective film (preferably comprising silver), a first spacer coat, a second infrared-reflective film (preferably comprising silver), a second spacer coat, a third infrared-reflective film (preferably comprising silver), and a second absorber film comprising nitride.

In the present embodiments, the first and second spacer coats preferably consist essentially of transparent dielectric film.

DETAILED DESCRIPTION OF PREFERRED EMBODIMENTS

The following detailed description is to be read with reference to the drawings, in which like elements in different drawings have like reference numbers. The drawings, which are not necessarily to scale, depict selected embodiments and are not intended to limit the scope of the invention. Skilled artisans will recognize that the given examples have many alternatives that fall within the scope of the invention.

Figure 1:
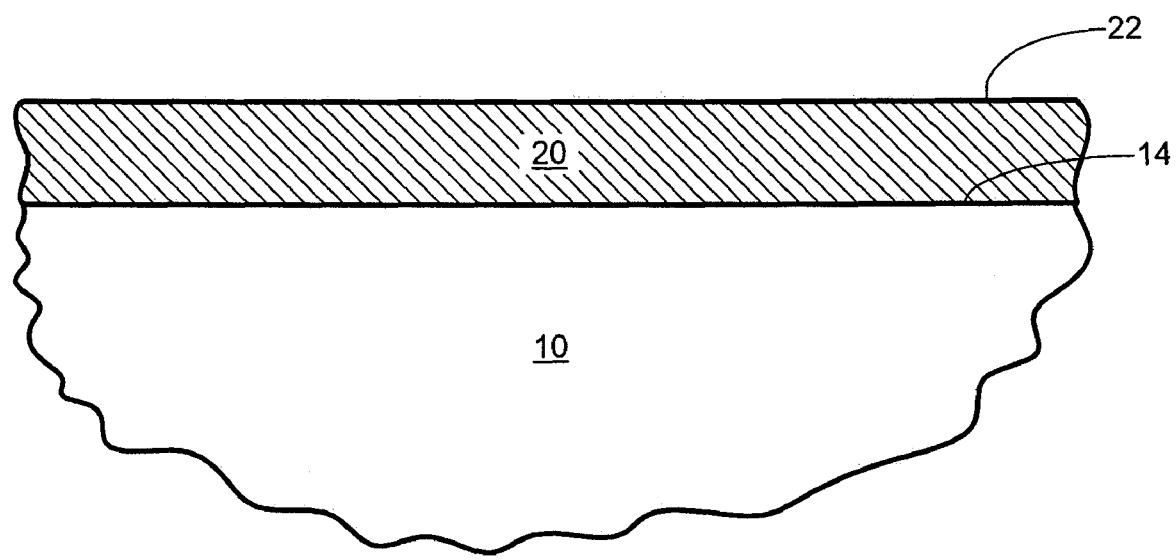
FIG. 1 is a schematic cross-sectional view of a substrate bearing a low-emissivity coating in accordance with certain embodiments of the invention.

FIG. 1 illustrates a substrate 10 having a surface (e.g., a major surface) 14 bearing a solar control low-emissivity coating 20. The solar control low-emissivity coating 20 exhibits advantageous shading properties. In some cases, the coating is used as both a temperable and non-temperable version of a low-emissivity coating. In such cases, the coating preferably has the same, or substantially the same, properties before and after tempering.

A wide variety of substrate types are suitable. In some cases, the substrate is a sheet-like substrate having generally opposed first 12 and second 14 major surfaces. For example, the substrate can be a sheet of transparent material (i.e., a transparent sheet). The substrate, though, is not strictly required to be a sheet, nor is it required to be transparent in all embodiments.

For many applications, the substrate will comprise a transparent (or at least translucent) material, such as glass or plastic. For example, the substrate is a glass sheet (e.g., a window pane) in certain embodiments. A variety of glass types can be used, and soda-lime glass will commonly be preferred. In certain embodiments, the substrate is part of a window, skylight, door, or another glazing (e.g., an automobile glazing).

Substrates of various sizes can be used. Commonly, large-area substrates are used. Certain embodiments involve a substrate with a major dimension (e.g., a length or width) of at least about 0.5 meter, preferably at least about 1 meter, perhaps more preferably at least about 1.5 meters (e.g., between about 2 meters and about 4 meters), and in some cases at least about 3 meters. In some cases, the substrate is a jumbo glass sheet with a length and/or width of between about 3 meters and about 10 meters, e.g., a glass sheet with a width of about 3.5 meters and a length of about 6.5 meters. Substrates with a length and/or width of greater than about 10 meters are also anticipated.

In some embodiments, the substrate is a generally square or rectangular glass sheet. The substrate in these embodiments can have any of the dimensions described in the preceding paragraph and/or in the following paragraph. In one embodiment, the substrate is a rectangular glass sheet with a width of between about 3 meters and about 5 meters, such as about 3.5 meters, and a length of between about 6 meters and about 10 meters, such as about 6.5 meters.

Substrates of various thicknesses can be used. In some cases, the substrate has a thickness of about 1-5 mm. Certain embodiments involve a substrate with a thickness of between about 2.3 mm and about 4.8 mm, and perhaps more preferably between about 2.5 mm and about 4.8 mm. When the substrate is float glass, it will commonly have a thickness of between about 4 mm and about 19 mm. In other embodiments, the substrate is a thin sheet with a thickness of between about 0.35 mm and about 1.9 mm.

As shown in FIG. 1, the solar control low-emissivity coating 20 is deposited on a surface 14 of the substrate 10. The coating 20 can have two infrared-reflective films (see FIG. 2), three infrared-reflective films (see FIG. 3), or more infrared-reflective films. Preferably, each infrared-reflective film comprises silver.

Figure 2:
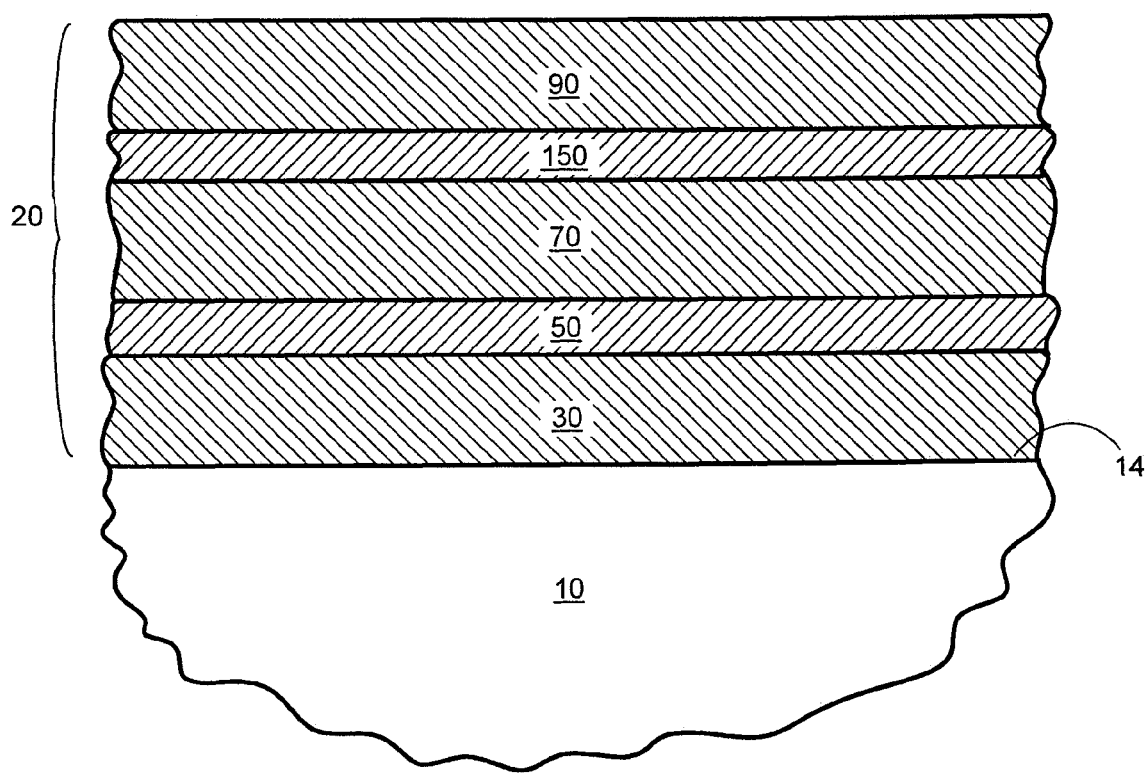
FIG. 2 is a schematic cross-sectional view of a substrate bearing a double-type low-emissivity coating in accordance with one embodiment group of the invention.

FIG. 2 shows a double-type low-emissivity coating 20, which has two infrared-reflective films. Here, the coating 20 includes a base coat 30, a first infrared-reflective film 50, a middle coat 70, a second infrared-reflective film 150, and an outer coat 90. In some cases, blocker layers are added to the illustrated film stack, as described below.

The base coat 30 includes at least one dielectric film. The term "dielectric" is used herein to refer to any non-metallic (i.e., neither a pure metal nor a metal alloy) compound of the type commonly used in thin film glazing applications. Included are metal oxides, metal nitrides, metal carbides, metal sulfides, metal borides, and combinations thereof (e.g., oxynitrides). Further, the term "metal" is defined herein to include proper metals as well as semi-metals (i.e., metalloids). Useful metal oxides include oxides of zinc, tin, indium, aluminum, bismuth, titanium, hafnium, zirconium, and mixtures thereof. While metal oxides are advantageous due to their ease and low cost of application, metal nitrides (e.g., silicon nitride) can also be used advantageously. Skilled artisans will be familiar with other useful dielectric materials.

The optical thickness of the base coat should be appropriate for antireflecting the silver films (or whatever other infrared-reflective films may be used). This optical thickness, for example, may range from about 90 Å to about 900 Å, such as between about 120 Å and about 550 Å.

Preferably, the base coat 30 includes a dielectric absorber film. The dielectric absorber film has sufficient absorption to be significant to the optical design. Thus, it is formed of dielectric material that is at least partially absorptive of visible radiation. For example, the coefficient of extinction (k) at 550 nm can optionally be greater than 0.1, greater than 0.4, greater than 0.6, or even greater than 0.75. Titanium nitride, for instance, has an extinction coefficient of greater than 1.0 at 550 nm. The dielectric absorber film helps establish the desired visible transmission and shading ability of the coating 20, while also contributing to the stability (color stability, thermal stability, or both) and durability of the coating.

In some cases, the dielectric absorber film comprises a nitride. For example, the dielectric absorber film can comprise titanium nitride and/or niobium nitride. Optionally, the film can consist essentially of titanium nitride and/or niobium nitride.

In certain embodiments, the dielectric absorber film comprises an oxynitride. For example, a film comprising (or consisting essentially of) titanium oxynitride and/or niobium oxynitride can be used. In one embodiment, the oxynitride comprises titanium and aluminum.

As noted above, certain embodiments employ a dielectric absorber film comprising both titanium nitride and niobium nitride. Some of these embodiments use an absorber film consisting essentially of titanium nitride and niobium nitride. In one such embodiment, the titanium nitride is present in a larger percent than the niobium nitride. This may be preferred for achieving particular color properties.

In other embodiments, the dielectric absorber film comprises a nitride of aluminum, chromium, zirconium, nickel-chrome, or other metals. Here, the absorber film can optionally consist essentially of a nitride of the desired metal(s). Alternatively, it can consist essentially of an oxynitride of the desired metal(s).

In one group of embodiments, the dielectric absorber film comprises a partially nitrided film, a partially oxidized film, or a partially oxynitrided film. A partially oxidized film (e.g., a suboxide), for instance, can be deposited using a ceramic suboxide target like those described in U.S. Pat. Nos. 6,461,686 and 6,468,402 and 6,511,587 (the teachings of each which are incorporated herein by reference). Targets of this nature can also be sputtered under conditions (e.g., in a gas mix) selected to deposit a partially oxynitrided film. Other embodiments provide a partially nitrided film, a partially oxidized film, or a partially oxynitrided film that comprises zinc and aluminum. The terms "partially nitrided," "partially oxidized," and "partially oxynitrided" refer to films that are less than fully nitrided, less than fully oxidized, or less than fully oxynitrided, as the case may be.

Certain embodiments provide the dielectric absorber film as a mixture of transparent dielectric material and noble metal. For example, the transparent dielectric film can be silicon nitride and the noble metal can be gold or iridium, to name just a few. When mixtures of transparent dielectric material and noble metal are used, it may be desirable to avoid oxidizing the noble metal during deposition.

In some embodiments, the dielectric absorber film comprises a mixture of transparent dielectric material and dielectric material that is at least partially absorptive. Examples include mixtures of silicon nitride and titanium nitride, mixtures of silicon nitride and aluminum nitride and titanium nitride, mixtures of niobium oxide and niobium nitride, and oxynitrides of such mixtures. Many other mixtures of absorbing and non-absorbing dielectrics can be used.

One group of embodiments employs a mixture comprising silicon nitride and at least one other nitride, which preferably is at least partially absorptive. As noted above, titanium nitride can be mixed with silicon nitride. Another example is a mixture comprising silicon nitride and niobium nitride. A film comprising silicon nitride, titanium nitride, and niobium nitride may also be used. Another example is a mixture comprising silicon nitride and chromium nitride. Still another example is a mixture comprising silicon nitride and zirconium nitride. Silicon nitride may also be mixed with a variety of nickel-chrome nitrides. Aluminum nitride can optionally be included in any of the noted mixtures. Further, the desired mixture may include additional components, e.g., the mixture can include any three or more of the noted nitrides. The mixed nitride can optionally consist essentially of nitride film. Or, it may include a significant amount of oxide and/or oxynitride. Moreover, any of the mixed nitrides noted above can be replaced with an oxynitride of the specified elements.

In one preferred group of embodiments, the dielectric absorber film is an advantageous neutral absorber having a neutral absorption ratio of $k_{380<\lambda<450\ nm}/k_{650<\lambda<760\ nm}$ between 0.52 and 1.9, such as between 0.55 and 1.8. The neutral absorber allows manufacturers to employ a basic layer stack that is relatively color neutral, such as a relatively color-neutral silver-based stack, and achieve various levels of shading performance without a selective absorption effect that drastically impacts the color properties of the basic stack. This can yield coated substrates with many different levels of shading ability, as well as good reflected color from both sides, good transmitted color, and good color stability (described below).

Figure 7:
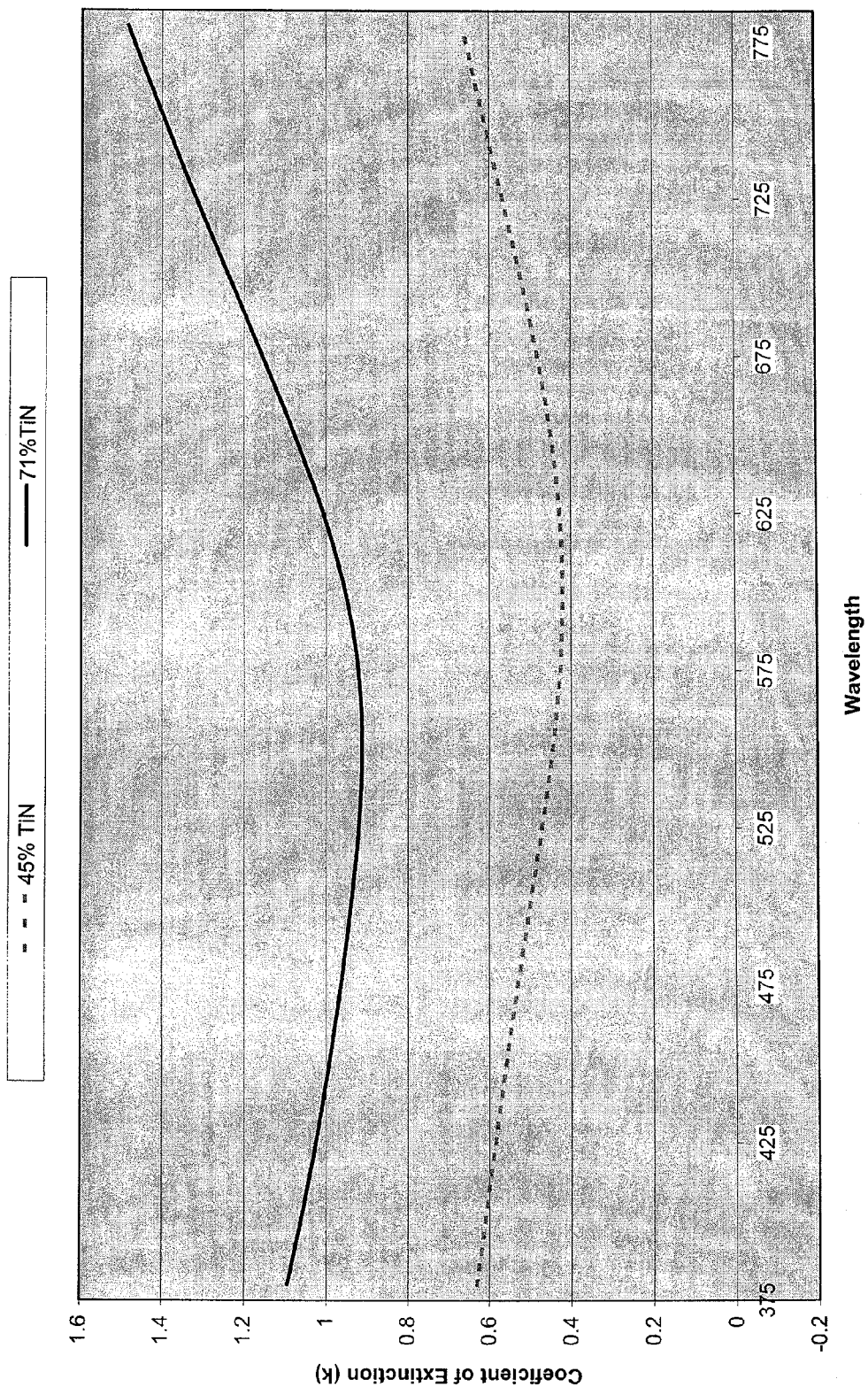
FIG. 7 is a graph showing coefficient of extinction versus wavelength for two different dielectric absorber compositions in accordance with certain embodiments of the invention.
Figure 8:
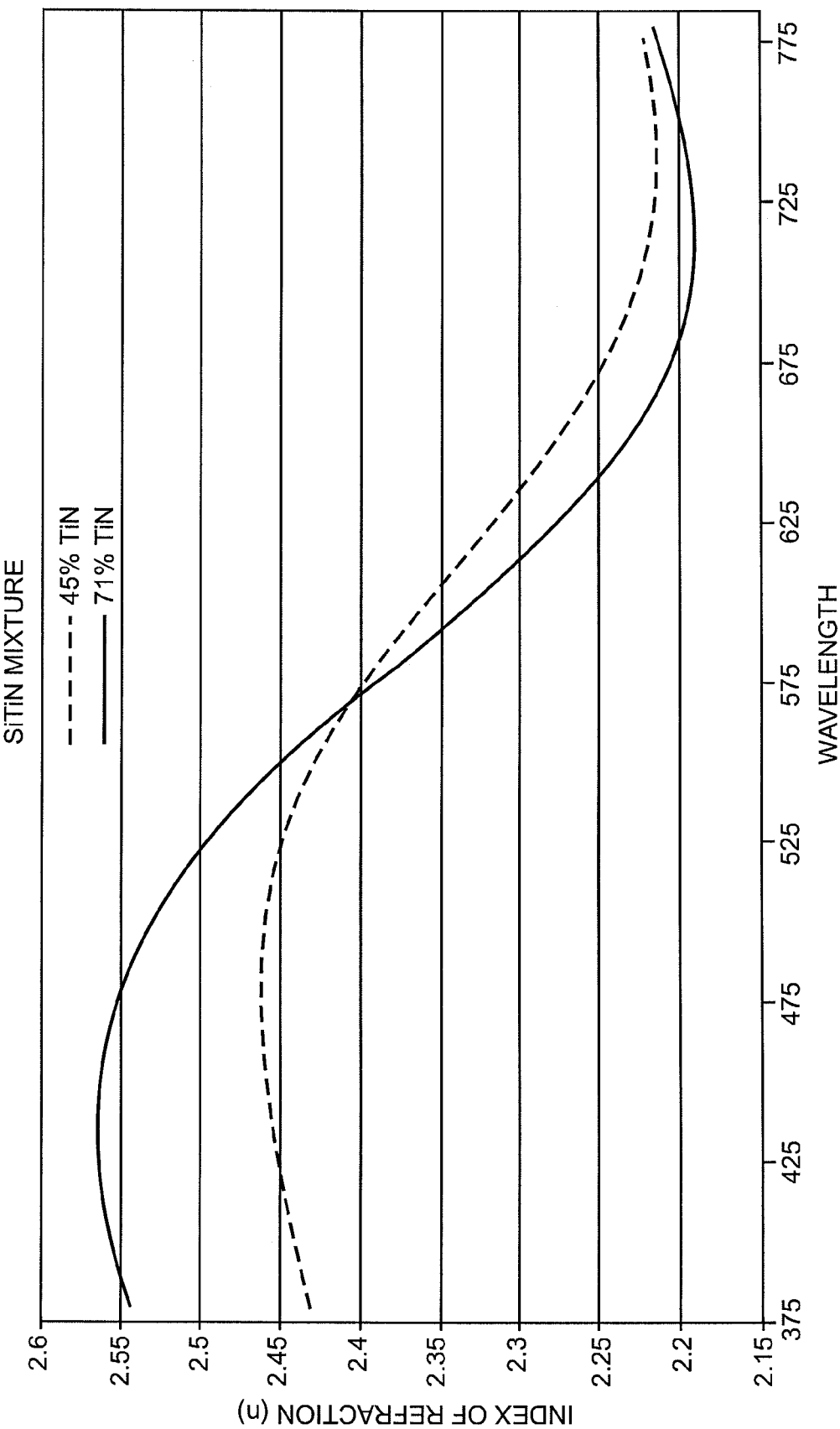
FIG. 8 is a graph showing refractive index versus wavelength for the two dielectric absorber compositions of FIG. 7.

FIGS. 7 and 8 show graphs of extinction coefficient (k) and refractive index (n) versus wavelength for two different compounds of silicon nitride mixed with titanium nitride. In these figures, the curve with the dotted line is for a mixture of 45% titanium nitride and 55% silicon nitride, while the curve with the solid line is for a mixture of 71% titanium nitride and 29% silicon nitride.

In FIG. 7, the 45% titanium nitride/55% silicon nitride has a neutral absorption ratio of $k_{380<\lambda<450\ nm}/k_{650<\lambda<760\ nm}$ equal to about 0.88-1.41, and the 71% titanium nitride/29% silicon nitride has a neutral absorption ratio of $k_{380<\lambda<450\ nm}/k_{650<\lambda<760\ nm}$ equal to about 0.69-1.02. This can be determined by: (1) taking the highest k value in the range between 380 nm and 450 nm, and taking the lowest k value in the range between 650 nm and 760 nm, and then determining the ratio of that highest k value over that lowest k value; and (2) taking the lowest k value in the range between 380 nm and 450 nm, and taking the highest k value in the range between 650 nm and 760 nm, and then determining the ratio of such lowest k value over such highest k value. Both of these ratios must be in the range specified for the neutral absorption ratio in the present embodiments.

FIG. 7 shows that a mixed nitride with somewhat even proportions of titanium and silicon gives an extinction coefficient with little dispersion in the visible spectra (380 nm-780 nm). This implies a very neutral absorption. These compounds, however, are merely examples. In the present embodiments, any neutral absorber compound having the specified neutral absorption ratio can be used.

In some cases, a dielectric absorber film is directly over the surface 14 of the substrate 10. Additionally or alternatively, the first infrared-reflective film 50 can be directly over this absorber film. Thus, in one embodiment, the base coat 30 is (e.g., consists essentially of, or consists of) a single dielectric absorber film (optionally a nitride or oxynitride absorber film), without any transparent dielectric film. Tables 1-3 below exemplify embodiments of this nature.

In other cases, a film of zinc oxide, zinc tin oxide, zinc aluminum oxide, or another transparent dielectric material is provided between the first infrared-reflective film 50 and an underlying dielectric absorber film. The term "transparent dielectric" refers to dielectric materials that are substantially non-absorptive of visible radiation, as described below.

Further, it may be desirable to provide a transparent dielectric film between the substrate and a dielectric absorber film in the base coat. For example, a film comprising silicon nitride, silica, tin oxide, or another transparent dielectric material may be used. One embodiment includes the following: glass/ transparent dielectric nitride film (such as silicon nitride)/ nitride absorber film/transparent dielectric oxide film/first infrared-reflective film (followed by the rest of the coating). This embodiment can be beneficial for preventing adverse chemistry during any tempering to which the coated substrate may be subjected (the coating is not required to be temperable in all embodiments).

In certain embodiments, the dielectric absorber film has an optical thickness of less than 600 Å and/or a physical thickness of less than 175 Å, less than 150 Å, less than 125 Å, or even less than 100 Å, for example 80-90 Å. Additionally or alternatively, the dielectric absorber film can have a physical thickness of at least about 35 Å, at least about 40 Å, at least about 50 Å, or at least about 75 Å. In one embodiment, the dielectric absorber film has a physical thickness of between about 50 Å and about 175 Å, such as between about 75 Å and about 100 Å.

An inner infrared-reflective film 50 is provided over the base coat 30. The inner infrared-reflective film 50 can be formed of any desired infrared-reflective material. Silver is preferred. However, gold, copper, and other infrared-reflective materials can be used. Likewise, alloys or mixtures of these materials can be used. In most cases, it will be preferable to employ silver or silver-containing layers. The term "silver containing" is used herein to refer to any film that contains at least some silver. For example, one may provide the infrared-reflective layers in the form of silver combined with a small amount of gold (e.g., about 5% gold or less).

The inner infrared-reflective film has a thickness selected to accommodate the desired properties (the desired emissivity, visible transmittance, etc.). In certain embodiments, the physical thickness is between about 50 Å and about 175 Å, such as between about 90 Å and about 120 Å. In some cases, the inner infrared-reflective film 50 has a thickness that is substantially the same as the thickness of the second infrared-reflective film 150. This, however, is by no means required. In one particular embodiment (see Table 1 below), the inner infrared-reflective film 50 has a thickness of about 105 Å.

Referring to FIG. 2, a middle coat 70 is provided over the inner infrared-reflective film 50. The middle coat includes at least one transparent dielectric film. As noted above, the term "transparent dielectric film" is used here to describe any dielectric film that is substantially non-absorptive of visible radiation. With this type of film, the extinction coefficient is not high enough to have an appreciable effect on the optical design of the film stack. A film of this nature, for example, may have an extinction coefficient (k) at 550 nm of less than 0.1, such as about zero for some materials.

The optical thickness of the middle coat should be appropriate for antireflecting the silver films (or whatever other infrared-reflective films may be used). For example, the optical thickness of the middle coat may range from about 180 Å to about 1,800 Å, such as between about 240 Å and about 1,100 Å.

Preferably, the middle coat does not include any dielectric absorber film, but rather consists essentially of transparent dielectric film. This has been found to give unexpected benefits in terms of exceptional color stability. In particular, it has been discovered that having partially absorbing films in the top and bottom of the coating gives surprising latitude in optical design, in that the coating can be very stable with respect to variations in film thickness. This also implies good color stability with viewing angle. In contrast, having the absorber layers between the infrared-reflective films appears to leave little latitude for design.

In some embodiments, a suboxide film (rather than a conventional metal blocker layer) is deposited directly over the infrared-reflective film 50. Preferably, a ceramic suboxide target is used for embodiments where a suboxide film is sputter deposited directly over the infrared-reflective film 50. Examples of ceramic suboxide targets include titanium suboxide, zinc aluminum suboxide, and niobium suboxide. While the thickness of such a suboxide film is not restricted, it can optionally have a physical thickness of less than 100 Å (while perhaps being greater than 35 Å), such as about 50 Å. It may be desirable, for example, to use suboxide blocker layers directly over the infrared-reflective films in non-temperable embodiments of the present coating.

As another alternative, metal blocker layers can be deposited directly over the infrared-reflective films. Such blocker layers, for example, can be deposited as metallic titanium, niobium, nickel-chrome, etc. In the present coating, any blocker layers deposited in metallic form preferably have physical thicknesses of less than 40 Å, less than 35 Å, less than 30 Å, or perhaps even less than 25 Å.

For temperable embodiments, it may be desirable to provide a two-part blocker coat. For example, directly over each infrared-reflective film there can be a thin metal film (optionally <20 Å, or even <18 Å, such as about 5-15 Å), directly over which a suboxide film can be deposited. Here again, the thickness of the suboxide film is not restricted (it can optionally be <100 Å).

Another alternative is to deposit a transparent dielectric nitride film directly over (i.e., in contact with) the first infrared-reflective film 50. Tables 1 and 2 below depict exemplary embodiments wherein silicon nitride is deposited directly over the first silver film. Other nitride materials can also be used.

Almost any number of transparent dielectric films can be used in the middle coat 70. In one embodiment, two transparent dielectric films are used. The middle coat 70, for example, can comprise a first film of a first transparent dielectric and a second film of a second transparent dielectric. One exemplary two-layer middle coat 70 has a first transparent dielectric film comprising a nitride (e.g., silicon nitride) and a second transparent dielectric film comprising an oxide (e.g., zinc oxide, zinc tin oxide, or zinc aluminum oxide).

As noted above, the middle coat (whether it is one or multiple films) preferably consists essentially of transparent dielectric film. Thus, the middle coat preferably does not have any dielectric absorber film of significant (e.g., optically important) thickness. In certain preferred embodiments, none of the films in the middle coat are dielectric absorber films, rather they are all transparent dielectric films.

In FIG. 2, a second infrared-reflective film 150 is provided over the middle coat 70. This film 150 can include any of the infrared-reflective materials described above. The second infrared-reflective film has a thickness selected to accommodate the desired emissivity, visible transmittance, etc. In certain embodiments, the physical thickness is between about 50 Å and about 200 Å, or between about 90 Å and about 120 Å. In some cases, the second infrared-reflective film 150 has a thickness that is substantially the same as the thickness of the inner infrared-reflective film 50. This is the case, for example, in the film stack of Table 1 below (where each silver layer has a thickness of 105 Å). However, this is by no means required.

FIG. 2 depicts an embodiment where the coating is a double-type low-emissivity coating. Therefore, the second infrared-reflective film 150 is the outermost infrared-reflective film in the coating. This is not the case in all embodiments, though, as will be discussed later.

In FIG. 2, an outer coat 90 is provided over the second infrared-reflective film 150. The outer coat 90 includes one or more dielectric films. As with the inner and middle coats, the optical thickness of the outer coat should be appropriate for antireflecting the silver films (or whatever other infrared-reflective films may be used). This optical thickness, for example, may range from about 90 Å to about 900 Å, such as between about 120 Å and about 550 Å.

Preferably, the outer coat 90 comprises a dielectric absorber film. Any of the dielectric absorber materials described above can be used.

When provided, the dielectric absorber film of the outer coat can optionally have an optical thickness of less than 600 Å and/or a physical thickness of less than 175 Å, less than 150 Å, less than 125 Å, or even less than 100 Å, for example about 90 Å. Additionally or alternatively, this layer may have a physical thickness of at least about 35 Å, at least about 40 Å, at least about 50 Å, or at least about 75 Å. In one embodiment, this layer has a physical thickness of between about 50 Å and about 175 Å, such as between about 75 Å and about 100 Å.

In many cases, a conventional blocker layer is deposited directly over the second infrared-reflective film 150. In other cases, a ceramic suboxide target is used to sputter deposit a suboxide film directly over the second infrared-reflective film. As another alternative, a two-part blocker coat can be used. As noted above, this can involve first depositing a thin metal film and then depositing a suboxide film directly over the thin metal film. If desired, a nitride absorber film can alternatively be provided directly over the second infrared-reflective film 150. Exemplary embodiments of this nature are shown below in Tables 1 and 2.

Preferably, at least one layer of film (optionally dielectric film) is provided over a dielectric absorber in the outer coat. For example, an outermost layer of silicon nitride can be used, as described in U.S. Pat. No. 6,652,974, the teachings of which concerning an outermost silicon nitride layer are incorporated herein by reference. In some cases, an outermost layer of silicon nitride is provided at a physical thickness of less than about 150 Å, less than about 100 Å, or less than about 75 Å, such as about 50 Å. The outermost layer can alternatively be deposited as a partially oxidized film. If a coated substrate with an outermost nitride layer is tempered, then the outermost layer likely will become partially oxidized. On the other hand, if the outermost layer is deposited as a partially oxidized film, then tempering likely will cause that layer to become fully oxidized (or at least more oxidized).

One example of a double-type low-emissivity coating will now be described. Referring to Table 1 below, the low-emissivity coating 20 includes the following sequence of films: substrate/(titanium nitride and/or niobium nitride)/silver/silicon nitride/zinc tin oxide/silver/(titanium nitride and/or niobium nitride)/silicon nitride. The thicknesses shown in Table 1 are merely exemplary.

TABLE 1

| Coating Part | Layer | Physical Thickness |
| --- | --- | --- |
| Outer Coat 90 | Silicon nitride | 50 Å |
|  | titanium nitride and/or niobium nitride | 90 Å |
| Infrared-Reflective Film 150 | Silver | 105 Å |
| Middle Coat 70 | zinc tin oxide | 550 Å |
|  | Silicon nitride | 50 Å |
| Infrared-Reflective Film 50 | Silver | 105 Å |
| Base Coat 30 | titanium nitride and/or niobium nitride | 90 Å |
| Substrate 10 | Glass | — |

Figure 3:
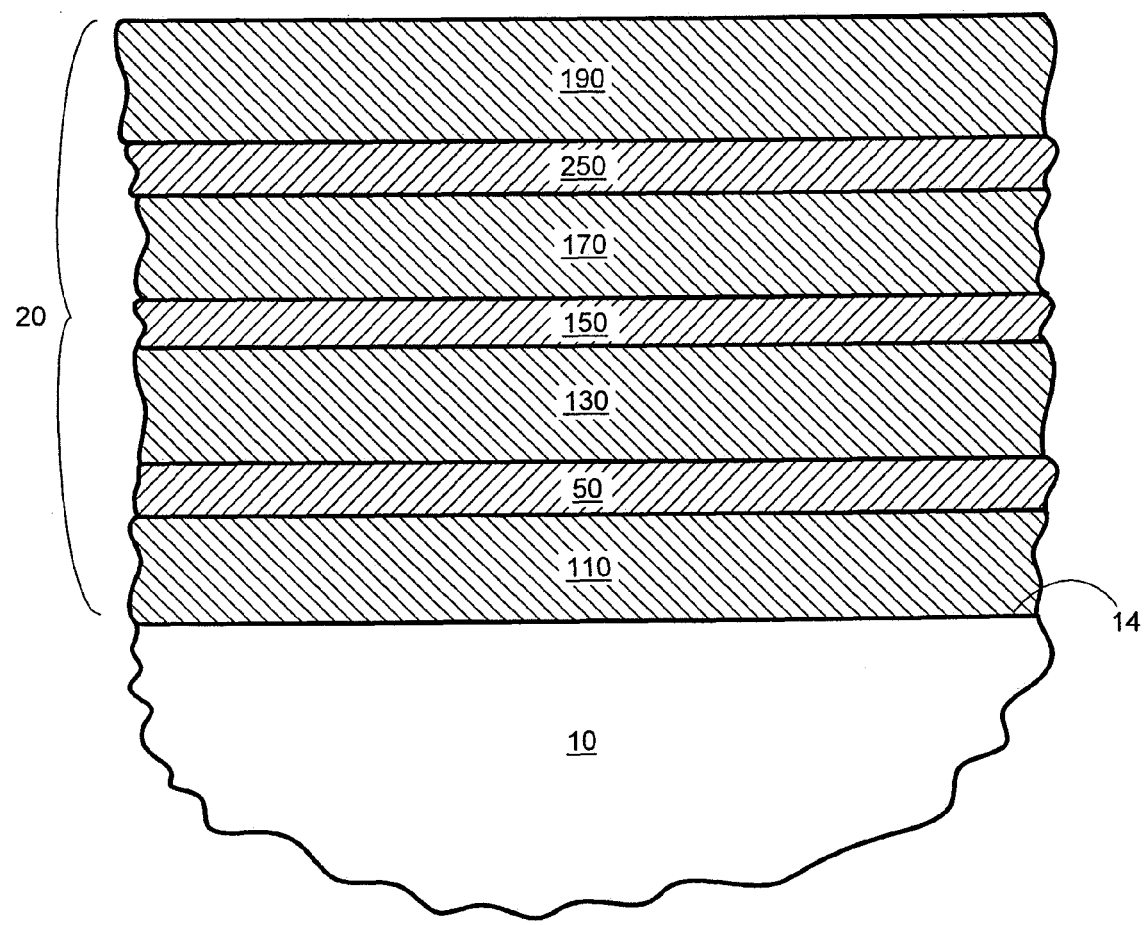
FIG. 3 is a schematic cross-sectional view of a substrate bearing a triple-type low-emissivity coating in accordance with another embodiment group of the invention.

FIG. 3 illustrates a triple-type low-emissivity coating 20, which has three infrared-reflective films. Here, the coating 20 includes a base coat 110, a first infrared-reflective film 50, a first spacer coat 130, a second infrared-reflective film 150, a second spacer coat 170, a third infrared-reflective film 250, and an outer coat 190. In some cases, blocker layers are added to the illustrated stack, as described herein.

The base coat 110 includes at least one dielectric film. Here again, the optical thickness of the base coat should be appropriate for antireflecting the silver films (or whatever other infrared-reflective films may be used). This optical thickness, for example, may range from about 90 Å to about 900 Å, such as between about 120 Å and about 550 Å.

Preferably, the base coat includes a dielectric absorber film. This dielectric absorber can comprise any of the dielectric absorber materials already discussed. In certain embodiments, this dielectric absorber film has an optical thickness of less than 600 Å and/or a physical thickness of less than 175 Å, less than 150 Å, less than 125 Å, or even less than 100 Å, such as about 80 Å. Additionally or alternatively, this dielectric absorber film can have a physical thickness of at least about 35 Å, at least about 40 Å, at least about 50 Å, or at least about 75 Å. In one embodiment, the dielectric absorber film has a physical thickness of between about 75 Å and about 175 Å, such as between about 75 Å and about 100 Å.

In certain embodiments, the base coat 110 is (e.g., consists essentially of, or consists of) a single dielectric absorber film, without any transparent dielectric film. In other embodiments, a film of zinc oxide, zinc tin oxide, zinc aluminum oxide, or another transparent dielectric material is provided between the first infrared-reflective film and an underlying dielectric absorber film. Further, some embodiments provide a silicon nitride film, a silica film, a tin oxide film, or another dielectric film between the substrate and an overlying dielectric absorber film. One embodiment includes the following: glass/transparent dielectric nitride film (such as silicon nitride)/nitride absorber film/transparent dielectric oxide film/first infrared-reflective film (followed by the rest of the coating). This embodiment can be beneficial for preventing adverse chemistry during any tempering to which the coated substrate may be subjected.

An inner infrared-reflective film 50 is provided over the base coat 110. This film 50 can include any of the infrared-reflective materials described above. The inner infrared-reflective film 50 has a thickness selected to accommodate the desired emissivity, visible transmittance, etc. In certain embodiments, the physical thickness is between about 50 Å and about 175 Å. In one embodiment, the inner infrared-reflective film has a thickness of about 80 Å.

A first spacer coat 130 is provided over the first infrared-reflective film 50. The first spacer coat 130 can comprise any of the films described above with respect to the middle coat 70 of FIG. 2. In certain embodiments, the first spacer coat 30 consists essentially of transparent dielectric film, and preferably does not include any dielectric absorber film.

The optical thickness of the first spacer coat should be appropriate for antireflecting the silver films (or whatever other infrared-reflective films may be used). This optical thickness, for example, may range from about 180 Å to about 1,800 Å, such as between about 240 Å and about 1,100 Å.

The first spacer coat 130 can optionally include a nitride film, such as silicon nitride, directly over the first infrared-reflective film 50. When provided, this nitride film can optionally have a physical thickness of between about 40 Å and about 60 Å, such as about 50 Å. These thickness ranges, however, are by no means required.

In many cases, a conventional blocker layer is deposited directly over the first infrared-reflective film. In other cases, a suboxide layer is deposited directly over the first infrared-reflective film 50. As another alternative, a two-part blocker can be used, as described above in more detail.

A second infrared-reflective film 150 is provided over the first spacer coat 130. This film 150 can include any of the infrared-reflective materials discussed above. The second infrared-reflective film 150 has a thickness selected to accommodate the desired emissivity, visible transmittance, etc. In some cases, the physical thickness is between about 50 Å and about 250 Å, such as between about 120 Å and about 160 Å. In one embodiment, the second infrared-reflective film 150 has a thickness of about 140 Å. The second infrared-reflective film 150 can optionally be thicker than both the inner and outer infrared-reflective films.

A second spacer coat 170 is provided over the second infrared-reflective film 150. The second spacer coat 170 can include any of the films described with respect to the middle coat 70 of FIG. 2. In some cases, the second spacer coat 70 consists essentially of transparent dielectric film. In these cases, it may be preferred for the second spacer coat not to include any dielectric absorber film. More generally, in some embodiments, all the dielectric film between any two infrared-reflective layers in the coating is transparent dielectric film.

The optical thickness of the second spacer coat should be appropriate for antireflecting the silver films (or whatever other infrared-reflective films may be used). This optical thickness, for example, may range from about 180 Å to about 1,800 Å, such as between about 240 Å and about 1,100 Å.

In some cases, the second spacer coat 170 includes a nitride film, such as silicon nitride, directly over the second infrared-reflective film 150. When provided, this nitride film can optionally have a physical thickness of between about 40 Å and about 60 Å, such as about 50 Å. These thickness ranges are merely exemplary.

In many cases, a conventional blocker layer is deposited directly over the second infrared-reflective film. As another alternative, a suboxide layer can be deposited directly over the second infrared-reflective film. As still another alternative, a two-part blocker coat can be used.

A third infrared-reflective film 250 is provided over the second spacer coat 170. This film 250 can include any of the infrared-reflective materials discussed above. The third infrared-reflective film 250 has a thickness selected to accommodate the desired emissivity, visible transmittance, etc. In some cases, the physical thickness is between about 50 Å and about 250 Å, such as between about 65 Å and about 95 Å. In one embodiment, the third infrared-reflective film 250 has a thickness of about 80 Å. The third infrared-reflective film 250 can optionally have substantially the same thickness as the inner infrared-reflective film 50.

In FIG. 3, the third infrared-reflective film 250 is the outermost infrared-reflective film 250 in the coating. This, however, is not the case in all embodiments. For example, the coating may have four or more infrared-reflective films.

With continued reference to FIG. 3, an outer coat 190 is provided over the third infrared-reflective film 250. The outer coat 190 here can include any of the films already discussed with respect to the outer coat 90 of FIG. 2.

The optical thickness of the outer coat should be appropriate for antireflecting the silver films (or whatever other infrared-reflective films may be used). This optical thickness, for example, may range from about 90 Å to about 900 Å, such as between about 120 Å and about 550 Å.

Preferably, the outer coat 190 comprises a dielectric absorber film. Any of the dielectric absorber materials described above can be used. When provided, the dielectric absorber film of the outer coat can optionally have an optical thickness of less than 600 Å and/or a physical thickness of less than 175 Å, less than 150 Å, less than 125 Å, or even less than 100 Å. Additionally or alternatively, this layer may have a physical thickness about 35 Å, at least about 40 Å, at least about 50 Å, at least about 75 Å. In one embodiment, this layer has a physical thickness of between about 50 Å and about 175 Å, such as between about 75 Å and about 100 Å.

In certain embodiments, the outer coat includes an outermost layer of silicon nitride or another film, optionally at a physical thickness of less than about 75 angstroms, such as about 50 angstroms.

In many cases, a conventional blocker layer is deposited directly over the third infrared-reflective film. In other cases, a suboxide layer is deposited directly over the third infrared-reflective film. As another alternative, a two-part blocker can be used.

One example of a low-emissivity coating like that illustrated in FIG. 3 will now be described. Referring to Table 2, illustrated below, the low-emissivity coating 20 includes the following sequence of films: substrate/(titanium nitride and/or niobium nitride)/silver/silicon nitride/zinc tin oxide/silver/silicon nitride/zinc tin oxide/silver/(titanium nitride and/or niobium nitride)/silicon nitride. The thicknesses shown in Table 2 are merely exemplary.

TABLE 2

| Coating Part | Layer | Physical Thickness |
|---|---|---|
| Outer Coat 190 | silicon nitride | 50 Å |
| | titanium nitride and/or niobium nitride | 80 Å |
| Infrared-Reflective Film 250 | Silver | 80 Å |
| Spacer Coat 170 | zinc tin oxide | 540 Å |
| | silicon nitride | 50 Å |
| Infrared-Reflective Film 150 | Silver | 140 Å |
| Spacer Coat 130 | zinc tin oxide | 540 Å |
| | silicon nitride | 50 Å |
| Infrared-Reflective Film 50 | Silver | 80 Å |
| Base Coat 110 | titanium nitride and/or niobium nitride | 80 Å |
| Substrate 10 | Glass | — |

Certain embodiments provide a solar control low-emissivity coating 20 in which suboxide layers are directly over two or more infrared-reflective films. While the thicknesses of these suboxide layers are not restricted, each such layer can optionally be greater than 30 Å, greater than 40 Å, greater than 50 Å, and/or less than 150 Å, less than 100 Å, or less than 75 Å. Ceramic suboxide targets can be used advantageously for depositing such barrier layers. Useful targets and methods of this nature have already been described. Table 3 below shows one exemplary coating in accordance with the present embodiments. Here, titanium suboxide barrier layers are deposited by sputtering ceramic suboxide targets (e.g., comprising both TiO and $TiO_2$). These targets can optionally be sputtered under conditions that result in the film being less than fully oxidized (e.g., so that the film comprises both TiO and $TiO_2$). Suboxide barrier layers are advantageous in that they provide good pre-temper durability and good control over optical properties.

In the present embodiments, directly over each suboxide barrier layer, there can optionally be a transparent dielectric film. In Table 3, zinc tin oxide is used, but many other dielectrics can be used. (The thicknesses in Table 3 are merely exemplary.) FIGS. 9-14 show optical properties of a monolithic substrate bearing the exemplary coating of Table 3.

TABLE 3

| Coating Part | Layer | Physical Thickness |
| --- | --- | --- |
| Outer Coat 190 | silicon nitride | 50 Å |
|  | titanium nitride and/or niobium nitride | 60 Å |
| Infrared-Reflective Film 250 | Silver | 100 Å |
| Spacer Coat 170 | zinc tin oxide | 460 Å |
| Dielectric Barrier Layer | titania (including TiO and $TiO_2$) | 50 Å |
| Infrared-Reflective Film 150 | Silver | 135 Å |
| Spacer Coat 130 | zinc tin oxide | 550 Å |
| Dielectric Barrier Layer | titania (including TiO and $TiO_2$) | 50 Å |
| Infrared-Reflective Film 50 | Silver | 100 Å |
| Base Coat 110 | titanium nitride and/or niobium nitride | 90 Å |
| Substrate 10 | Glass | — |

In one embodiment, a ceramic suboxide target is used to sputter deposit a suboxide film directly over the outermost infrared-reflective film in the coating 20. While the thickness of this suboxide film is not restricted, it can optionally be greater than 30 Å, greater than 40 Å, greater than 50 Å, and/or less than 150 Å, less than 100 Å, or less than 75 Å. A ceramic target comprising titanium suboxide (e.g., including both TiO and $TiO_2$) can optionally be used. For the target material, zinc aluminum suboxide is another option, as is niobium suboxide, to name just a few. Directly over the suboxide barrier film, a dielectric absorber film can optionally be applied. This arrangement can provide particularly good durability among a silver film, the suboxide barrier film, and the dielectric absorber film. It can also provide particularly good control over optical properties. The following film sequence, for example, can be incorporated into any embodiment of the present coating: outermost silver-containing film/titanium suboxide film/nitride absorber film (optionally followed by an outermost layer of silicon nitride or another film). The titanium suboxide film can comprise both TiO and $TiO_2$. More generally, the following film sequence can be incorporated into any embodiment of the present coating: outermost silver-containing film/partially oxidized film/dielectric absorber film (optionally followed by an outermost layer or layers). In these embodiments, the partially oxidized film can be replaced with a partially nitrided film, a partially oxynitrided film, etc.

Figure 4:
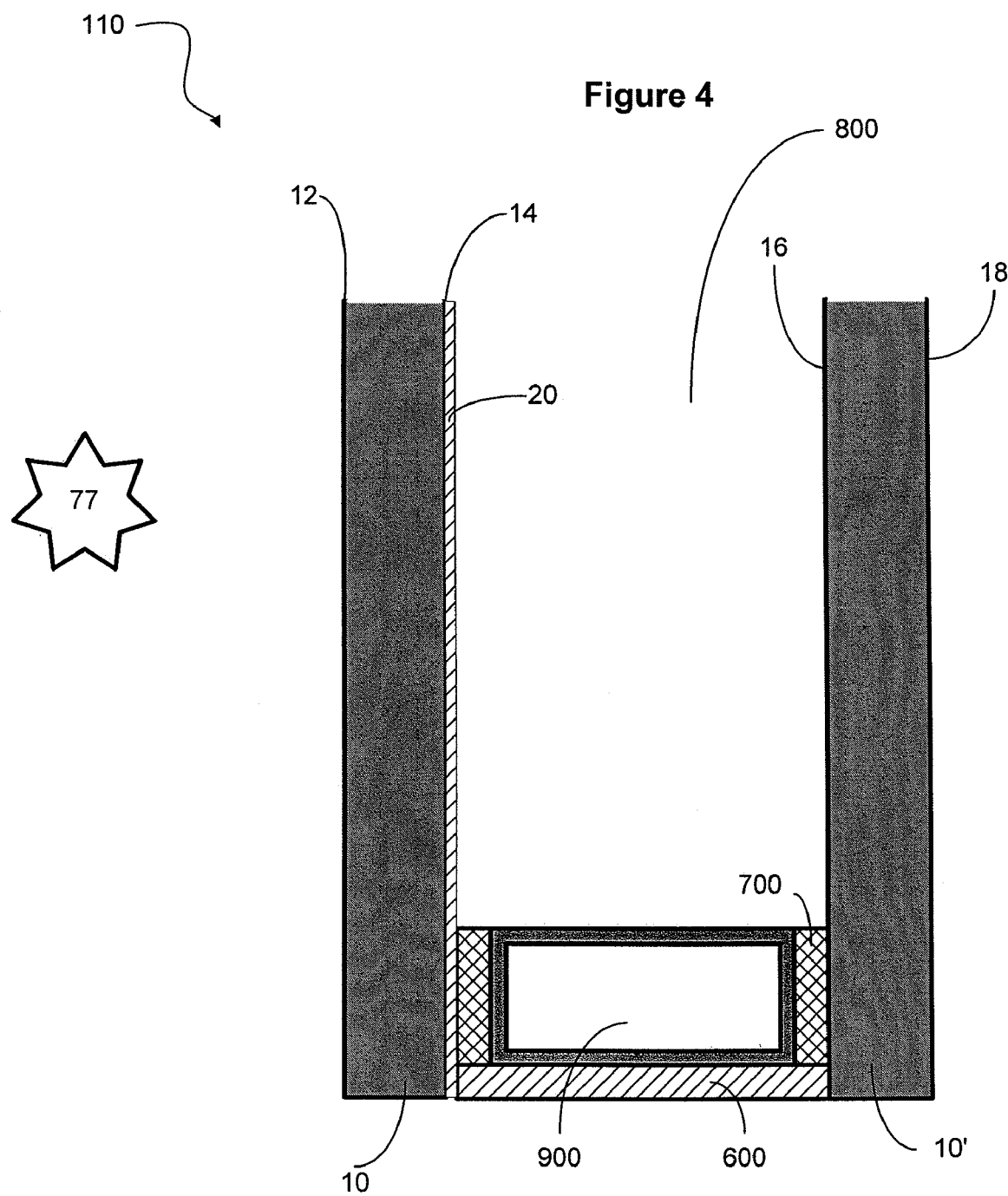
FIG. 4 is a partially broken-away schematic cross-sectional side view of a multiple-pane insulating glazing unit that includes a pane bearing a low-emissivity coating in accordance with certain embodiments of the invention.
Figure 5:
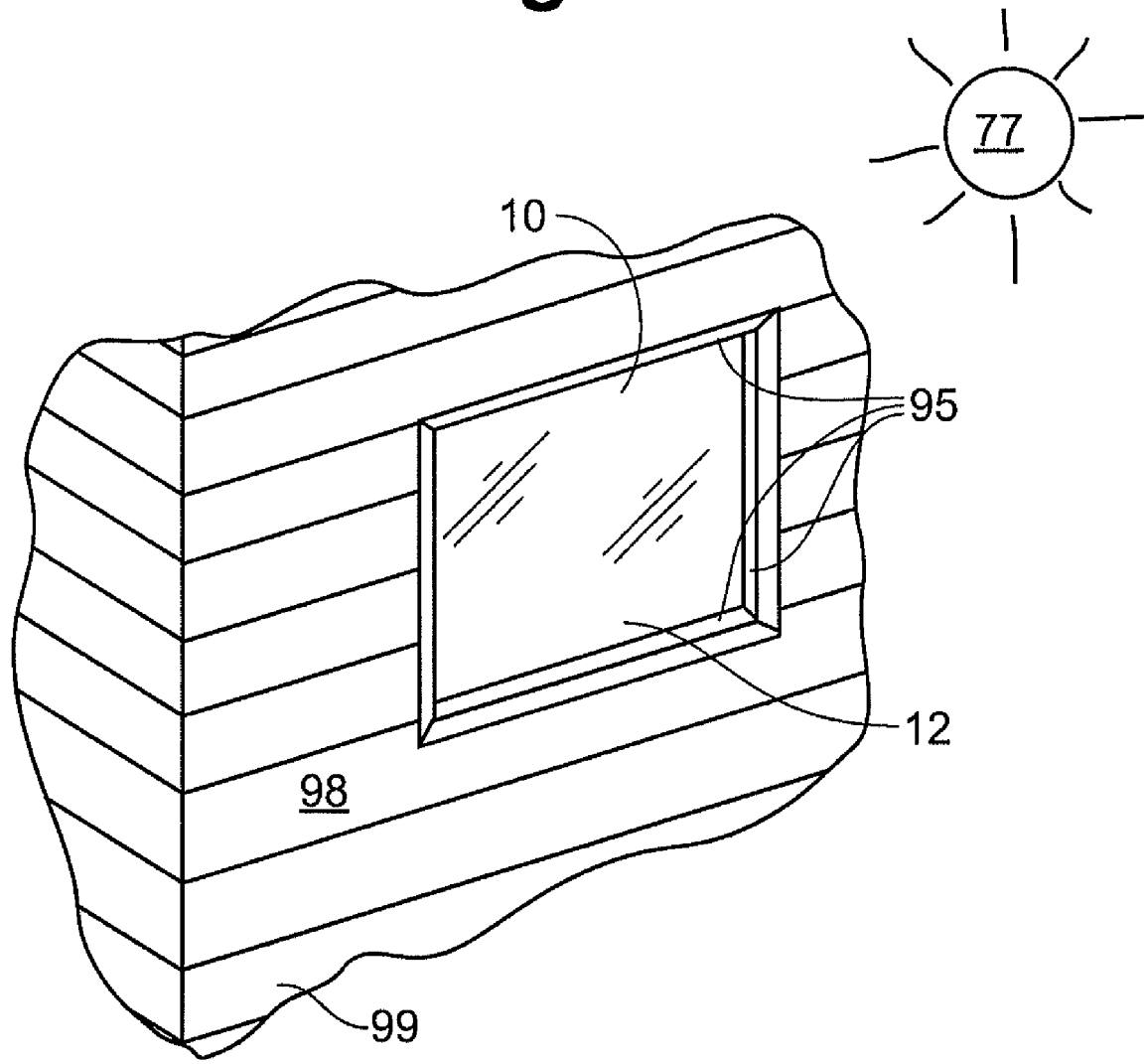
FIG. 5 is a partially broken-away perspective view of a pane carrying a low-emissivity coating, the pane being mounted in an exterior wall of a building in accordance with certain embodiments of the invention.

FIG. 4 is a partially broken-away schematic cross-sectional side view of a multiple-pane insulating glazing unit in accordance with certain embodiments of the invention. In FIG. 4, the unit 110 has an exterior pane 10 and an interior pane 10' separated by a between-pane space 800. A spacer 900 (which can optionally be part of a sash) is provided to separate the panes 10 and 10'. The spacer can be secured to the interior surfaces of each pane using a sealant 700. In some cases, an end sealant 600 is also provided. In the illustrated embodiment, the exterior pane 10 has an exterior surface 12 and an interior surface 14. The interior surface 14 bears a solar control low-emissivity coating 20 in accordance with any of the embodiments already described. The interior pane 10' has an interior surface 16 and an exterior surface 18. The pane 10 can be mounted in a frame (e.g., a window frame as illustrated in FIG. 5) such that the exterior surface 12 is exposed to an outdoor environment. Interior surfaces 14 and 16 are both exposed to the atmosphere in the between-pane space 800. While interior surface 14 bears the solar control low-emissivity coating in the illustrated embodiment, any other surface 12, 16, or 18 may alternatively or additionally bear such a coating. Further, the unit can optionally be a triple-pane glazing unit.

The substrate 10 bearing a low-emissivity coating 20 may be installed in a glazing frame (such as a window frame). In some cases, the substrate is first incorporated into an insulating glazing unit, as already described with reference to FIG. 4, and then the resulting unit is installed into a glazing frame. In other cases, the substrate is installed alone (e.g., as a single-pane glazing) into a glazing frame. FIG. 5 illustrates a pane, which can optionally be part of an IG unit, mounted on a frame 95 (e.g., in an exterior wall 98 of a building 99). The surface 12 is exposed to an outdoor environment.

The present solar control low-emissivity coating provides particularly desirable properties. The ensuing discussion reports some of these properties. The reported properties are for a monolithic pane of 3 mm soda lime float glass (uncoated on one side, and having the coating 20 on the other side). The substrate, of course, can be formed of materials other than float glass, and it can have other thicknesses. Also, the substrate can be part of a multiple-pane glazing (e.g., an IG unit), as already explained.

In certain embodiments, the coated substrate has low visible transmittance and low visible reflectance. The terms "visible transmittance" and "visible reflectance" are known in the art and are detailed in U.S. Patent Application Publication U.S. 2007/0082206, the teachings of which concerning these properties are incorporated herein by reference.

In some embodiments, the substrate 10 bearing the solar control low-emissivity coating 20 has a visible transmittance of less than 0.5. For example, the visible transmittance can optionally range between 0.34 and 0.46, such as between 0.36 and 0.44. In one embodiment, the visible transmittance is about 0.39.

In addition, the visible reflectance $R_v$ off either side of the coated substrate preferably is less than about 0.2. The coated substrate can have a visible reflectance $R_v$ (off either the glass side or the film side) of less than about 0.18, less than 0.15, or even less than 0.1. While the precise level of visible reflectance can be selected and varied in accordance with the present teachings, certain preferred embodiments achieve a visible reflectance $R_v$ of about 0.08-0.09.

The present coating 20 also has advantageous color properties. For example, good color (transmitted and reflected) can be achieved on both sides of the coated substrate. In some embodiments, the coated substrate has a transmitted color characterized by the following color coordinates: 0.2<x<0.35 (preferably 0.25<x<0.33) and 0.2<y<0.35 (preferably 0.25<y<0.33). In addition, the coated substrate can optionally have a reflected glass-side and/or film-side by the following color coordinates: 0.2<x<0.35 (such as 0.25<x<0.33) and 0.2<y<0.35 (such as 0.25<y<0.33). This is in accordance with the well known 1931 CIE color standard (as specified in FIGS. 9 and 10). Other colors may be desirable, of course, to accommodate particular applications.

One exemplary coating designed to provide color properties within the noted ranges is shown above in Table 3. Here, the coating is a triple-type low-emissivity coating. However, double-type embodiments of the present coating can also provide color properties within one or more (e.g., within all) of these ranges.

Figure 9:
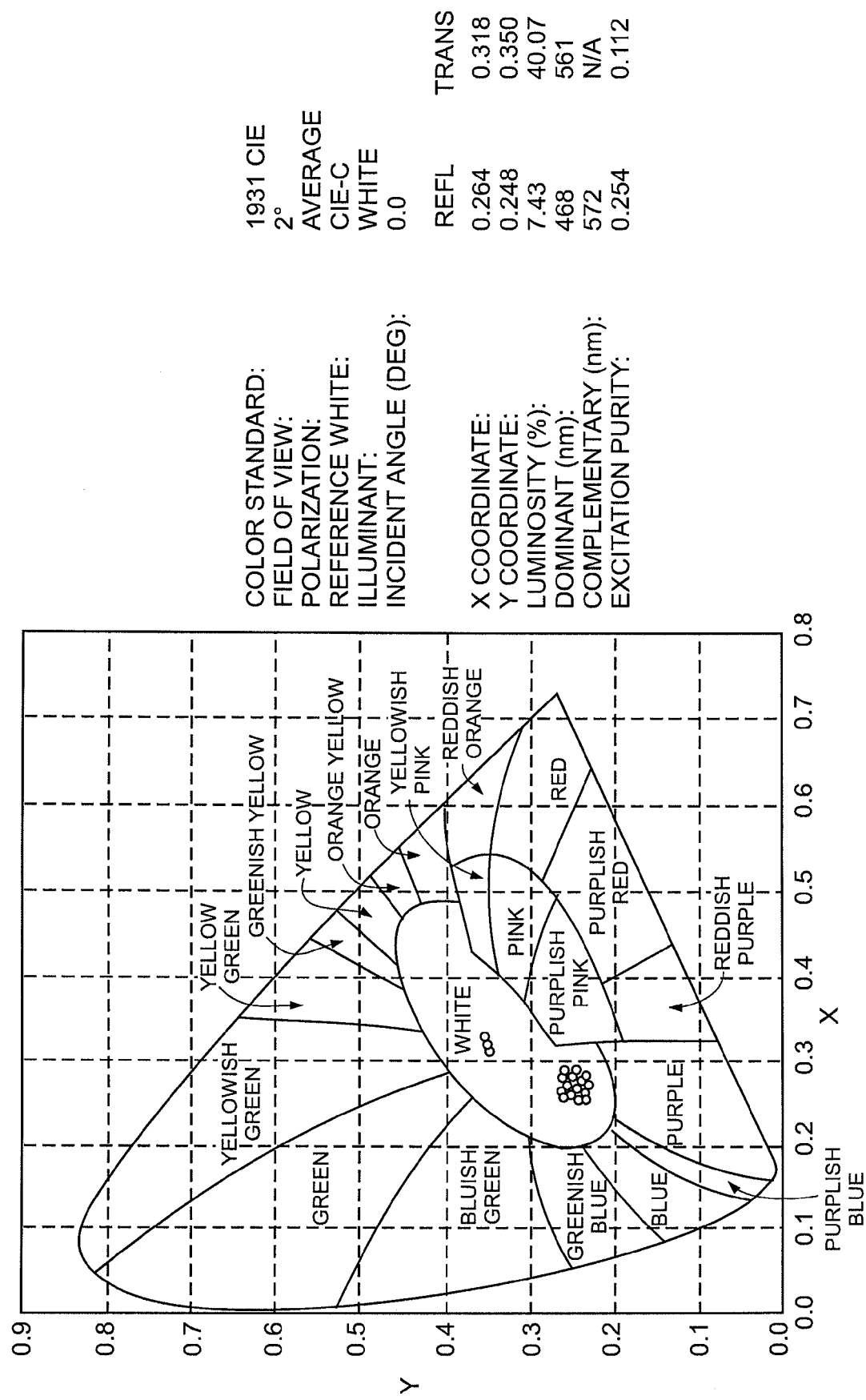
FIG. 9 is a graph showing color properties of transmission and glass-side reflection for a monolithic substrate bearing a low-emissivity coating in accordance with certain embodiments of the invention.

In FIG. 9, the small cluster of dots near the center of the color space is for transmission, and the larger cluster of dots is for glass-side reflection. Each cluster has 100 dots (although they are not all visible due to overlap) representing thickness variations of up to 3% for the layers of the coating. Here, it can be seen that the transmitted color is the faintest of green. (Neutral color is at the coordinates 0.33, 0.33.) The transmitted color is exceptionally stable, as shown by the very tight clustering of the transmission data points. The glass-side reflected color is blue, and it too is very stable.

Figure 10:
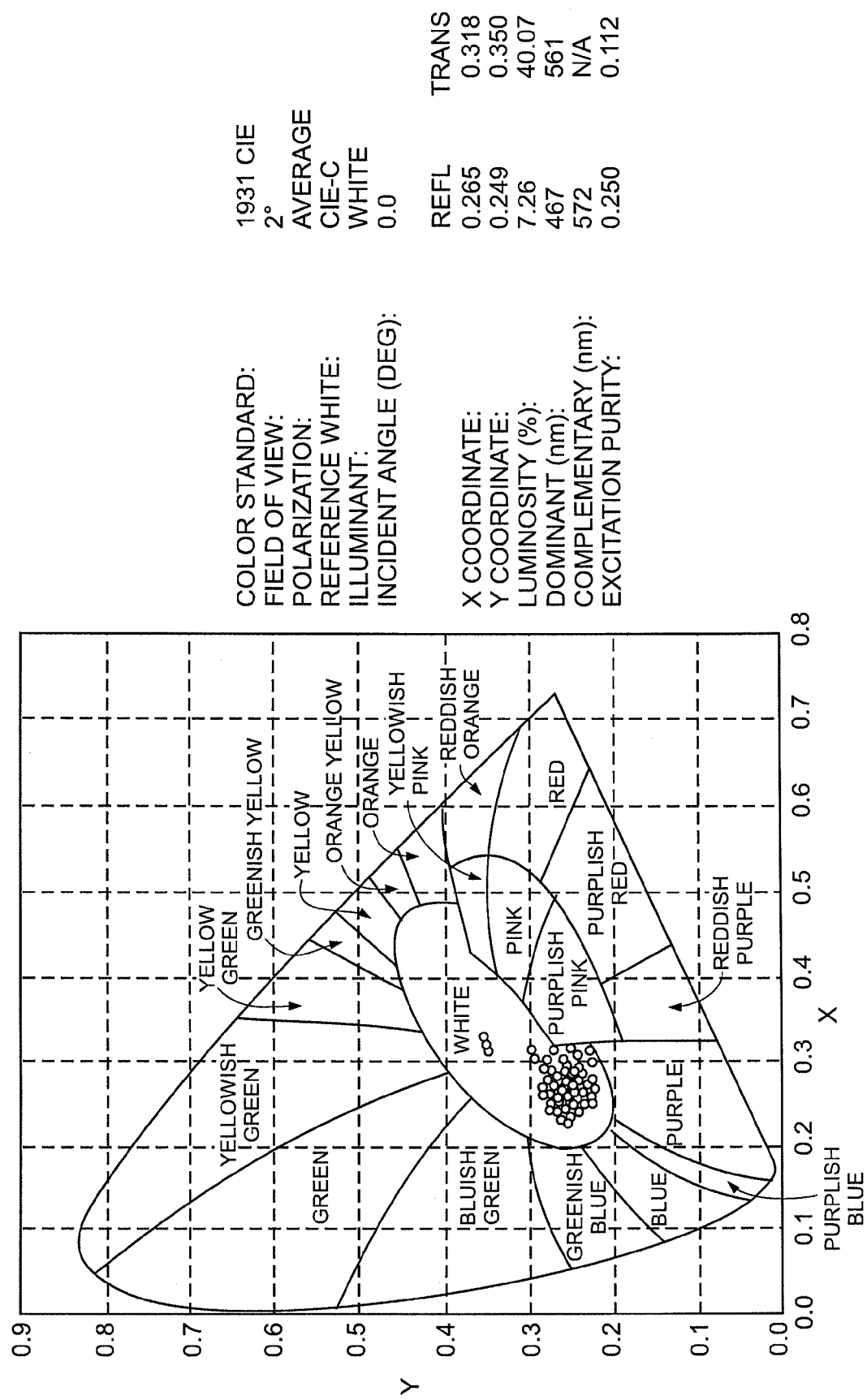
FIG. 10 is a graph showing color properties of transmission and film-side reflection for a monolithic substrate bearing a low-emissivity coating in accordance with certain embodiments of the invention.

In FIG. 10, the small cluster of 100 dots for transmission is again shown near the center of the color space. The larger cluster of 100 dots is for film-side reflection. The reflection here is blue to purple/blue, and the scatter is greater. However, this color will tend to be washed-out by the cover lite for embodiments where the coated substrate is part of an IG unit.

Figure 11:
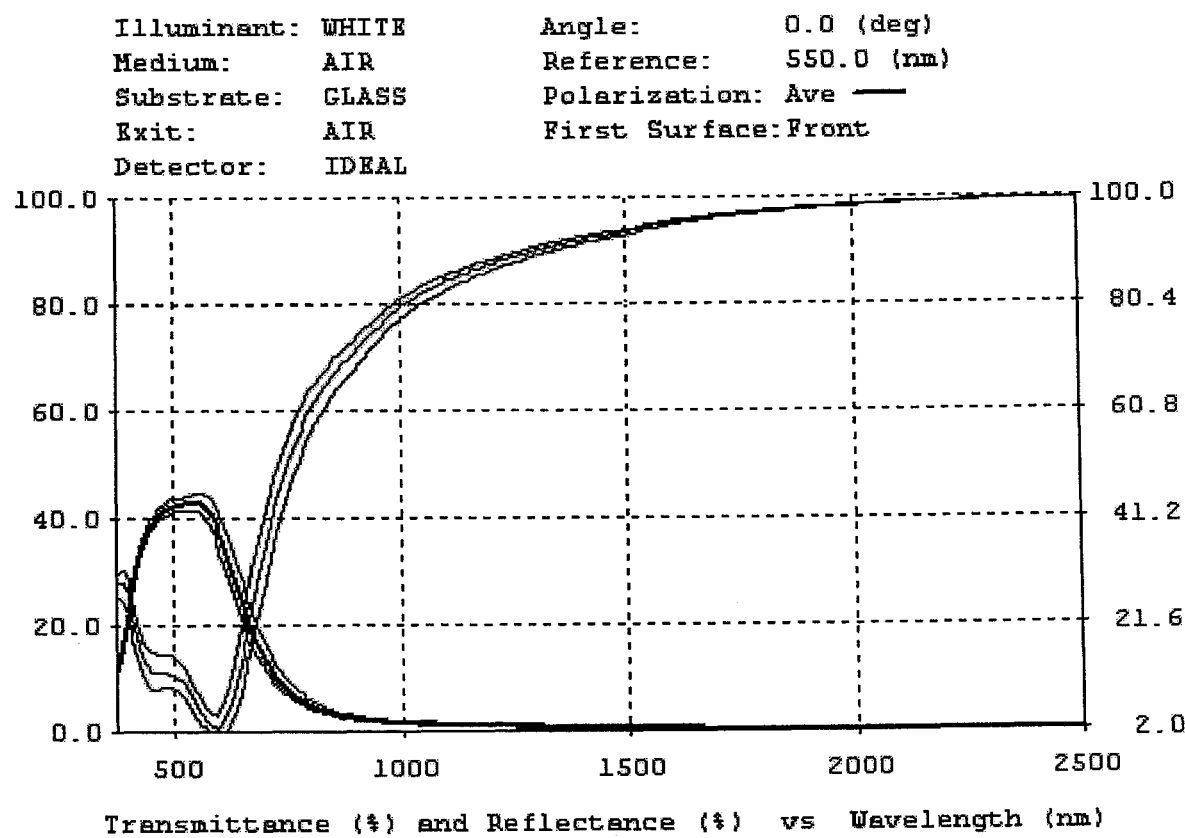
FIG. 11 is a graph showing transmission and glass-side reflection data for a monolithic substrate bearing a low-emissivity coating in accordance with certain embodiments of the invention.
Figure 12:
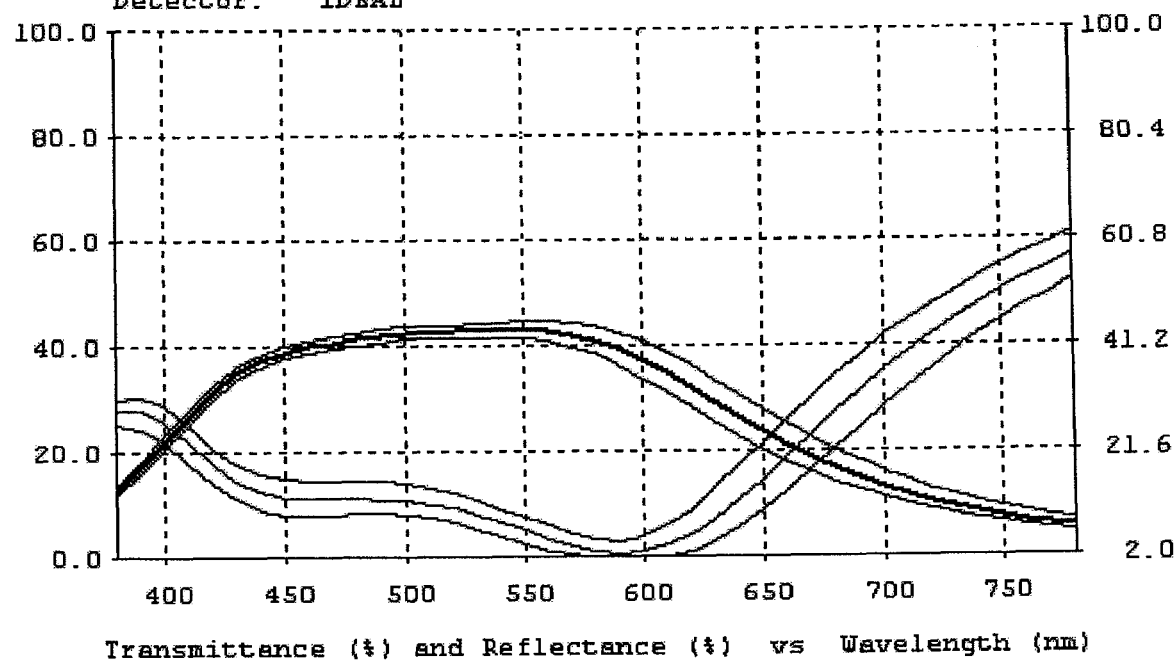
FIG. 12 is a graph detailing the visible spectrum portion of the data from FIG. 11.

FIGS. 11 and 12 show transmission and glass-side reflection data for a monolithic substrate bearing the coating of Table 3 above, in accordance with one embodiment of the invention. Here, it can be seen that the maximum visible transmission is less than 60%, e.g., between about 35% and about 50%, such as about 40-44%.

Figure 13:
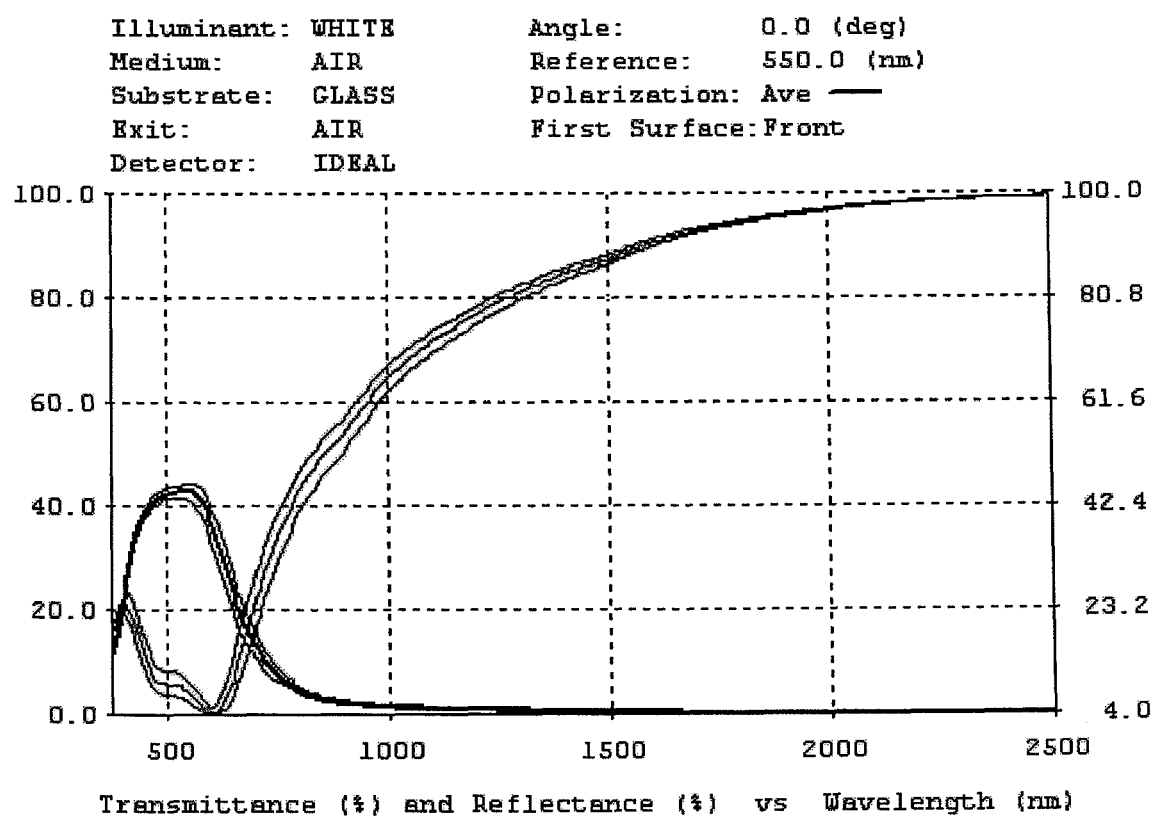
FIG. 13 is a graph showing transmission and film-side reflection data for a monolithic substrate bearing a low-emissivity coating in accordance with certain embodiments of the invention.
Figure 14:
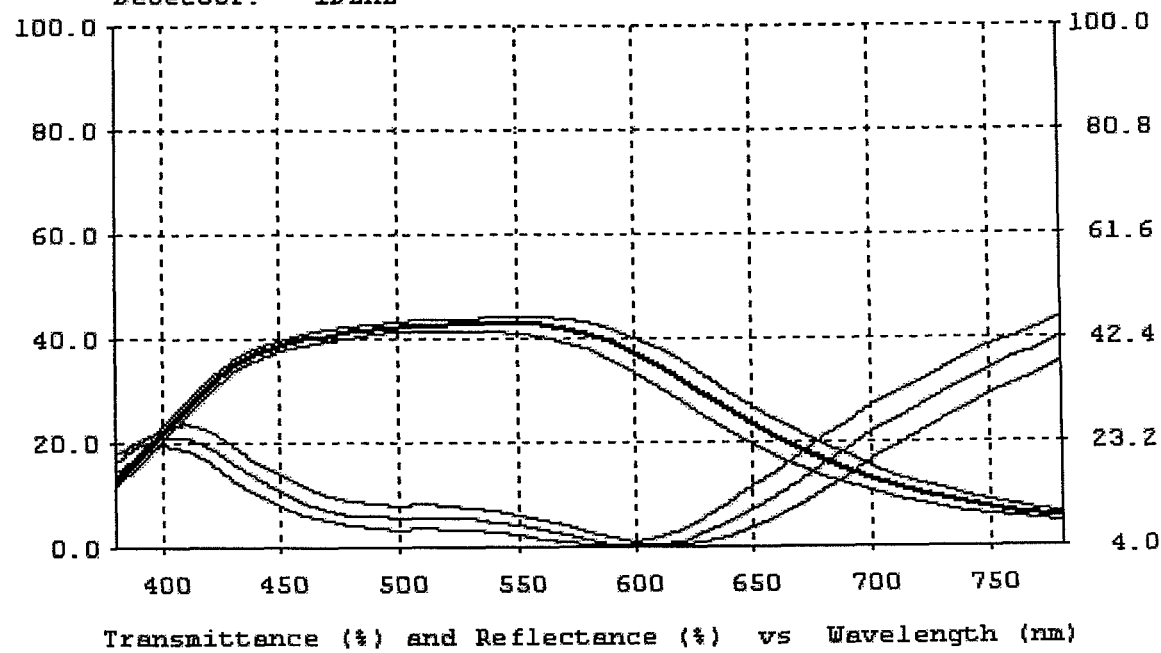
FIG. 14 is a graph detailing the visible spectrum portion of the data from FIG. 13.

FIGS. 13 and 14 show transmission and film-side reflection data for the monolithic substrate described above in connection with FIGS. 11 and 12. Again, the maximum visible transmission is less than 60%, e.g., between about 35% and about 50%, such as about 40-44%.

The present solar control low-emissivity coatings can be applied by a variety of well known coating techniques. For example, these coatings can be applied by sputter deposition (i.e., sputtering). Alternatively, other coating techniques can be used, including chemical vapor deposition (CVD), plasma-enhanced chemical vapor deposition, and pyrolytic deposition.

Figure 6:
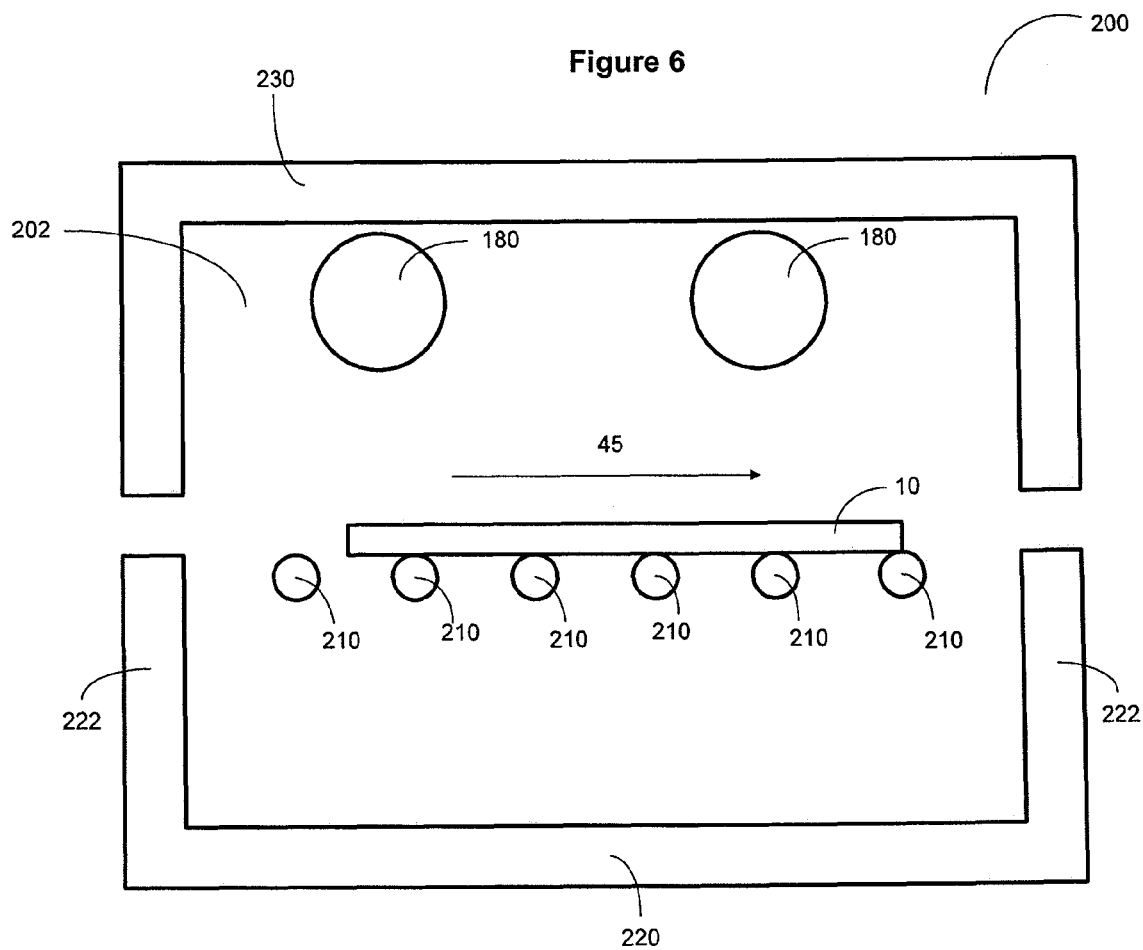
FIG. 6 is a schematic side view of a sputtering chamber adapted for use in certain methods of the invention.

Sputtering is well known in the present art. FIG. 6 depicts an exemplary magnetron sputtering chamber 200. Magnetron sputtering chambers and related equipment are commercially available from a variety of sources (e.g., Leybold). Useful magnetron sputtering techniques and equipment are described in U.S. Pat. No. 4,166,018, issued to Chapin, the entire teachings of which concerning sputtering techniques and equipment are incorporated herein by reference.

The illustrated sputtering chamber 200 includes a base (or "floor") 220, a plurality of side walls 222, and a ceiling (or "top lid" or "cover") 230, together bounding a sputtering cavity 202. In FIG. 6, two upper targets 180 are mounted above the path of substrate travel 45. The substrate 10 is conveyed along the path of substrate travel 45 during film deposition, optionally over a plurality of spaced-apart transport rollers 210. In FIG. 6, two upper targets are provided, although this is by no means required. For example, a single target could alternatively be used in each chamber. Moreover, the chamber can include one or more planar targets, although cylindrical targets are shown.

The present coatings, for example, can be manufactured using an in-line system with lock, where the coat zones have different gas composition separated by tunnels, where one or a plurality of targets are used to deposit each layer, where AC or DC sputtering is used, and the pressure is about 3-5 mTorr. Skilled artisans will be familiar with the various process and equipment options that can be used.

In certain embodiments, the coating 20 does not include any stainless steel oxide films. In some cases where the coated glass is crushed and used for cullet, it is preferred to avoid having stainless steel in the cullet.

While some preferred embodiments of the invention have been described, it should be understood that various changes, adaptations and modifications may be made therein without departing from the spirit of the invention and the scope of the appended claims.

What is claimed is:

1. A transparent substrate bearing a solar control low-emissivity coating, the coating comprising:
    an innermost infrared-reflective film comprising silver and an outermost infrared-reflective film comprising silver;
    a first dielectric absorber film between the substrate and the innermost infrared-reflective film, the first dielectric absorber film having a coefficient of extinction (k) of greater than 0.4 and having a neutral absorption ratio of $k_{380<\lambda<450\ nm}/k_{650<\lambda<760\ nm}$ between 0.52 and 1.9;
    a second dielectric absorber film further from the substrate than the outermost infrared-reflective film, the second dielectric absorber film having a coefficient of extinction (k) at 550 nm of greater than 0.4 and having a neutral absorption ratio of $k_{380<\lambda<450\ nm}/k_{650<\lambda<760\ nm}$ between 0.52 and 1.9; and
    the coating is either a double-type low-emissivity coating or a triple-type low emissivity coating,
    if the coating is a double-type emissivity coating, then it has a middle coat located between said two infrared-reflective films and the middle coat consists essentially of transparent dielectric film; and
    if the coating is a triple-type coating, then it further includes an intermediate infrared-reflective film comprising silver and it has two spacer coats each located between two of the infrared-reflective films and each consisting essentially of transparent dielectric film.

2. The substrate of claim 1 wherein the first and second dielectric absorber films both comprise nitride film.

3. The substrate of claim 1 wherein at least one of the first and second dielectric absorber films comprises a compound nitride including silicon nitride mixed with another nitride.

4. The substrate of claim 1 wherein the first and second dielectric absorber films both comprise a compound nitride including silicon nitride mixed with at least one other nitride selected from the group consisting of titanium nitride, niobium nitride, zirconium nitride, chromium nitride, and nickel-chrome nitride.

5. The substrate of claim 1 wherein at least one of the first and second dielectric absorber films comprises titanium nitride and/or niobium nitride.

6. The substrate of claim 1 wherein the first and second dielectric absorber films each have an optical thickness of less than 600 Å.

7. The substrate of claim 1 wherein the coated substrate has a monolithic visible transmittance of less than 0.60.

8. The substrate of claim 7 wherein the monolithic visible transmittance is between 0.30 and 0.50.

9. The substrate of claim 1 wherein the coated substrate has a monolithic transmitted color characterized by the following color coordinates: 0.2<x<0.35, and 0.2<y<0.35, under 1931 CIE color standard.

10. The substrate of claim 1 wherein the transparent substrate is a glass pane that is part of a multiple-pane insulating glazing unit.

11. A transparent substrate bearing a solar control low-emissivity coating, the coating being a double-type low-emissivity coating comprising:
   a first infrared-reflective film comprising silver and a second infrared-reflective film comprising silver, the first infrared-reflective film being closer to the substrate than the second infrared-reflective film;
   a middle coat between the first and second infrared-reflective films, wherein the middle coat does not include any dielectric absorber film but rather consists essentially of transparent dielectric film;
   a first dielectric absorber film between the substrate and the first infrared-reflective film, the first dielectric absorber film having a coefficient of extinction (k) at 550 nm of greater than 0.4; and
   a second dielectric absorber film further from the substrate than the second infrared-reflective film, the second dielectric absorber film having a coefficient of extinction (k) at 550 nm of greater than 0.4,
   wherein the first and second dielectric absorber films both have a neutral absorption ratio of $k_{380<\lambda<450\ nm}/k_{650<\lambda<760\ nm}$ between 0.52 and 1.9.

12. The substrate of claim 11 wherein the first and second dielectric absorber films both comprise nitride film.

13. The substrate of claim 11 wherein at least one of the first and second dielectric absorber films comprises a compound nitride including silicon nitride mixed with another nitride.

14. The substrate of claim 11 wherein both of the first and second dielectric absorber films comprise a compound nitride including silicon nitride mixed with at least one other nitride selected from the group consisting of titanium nitride, niobium nitride, zirconium nitride, chromium nitride, and nickel-chrome nitride.

15. The substrate of claim 11 wherein at least one of the first and second dielectric absorber films comprises titanium nitride and/or niobium nitride.

16. The substrate of claim 11 wherein the first and second dielectric absorber films each have an optical thickness of less than 600 Å.

17. The substrate of claim 11 wherein the coated substrate has a monolithic visible transmittance of between 0.30 and 0.50.

18. The substrate of claim 11 wherein the coated substrate has a monolithic transmitted color characterized by the following color coordinates: 0.2<x<0.35, and 0.2<y<0.35, under 1931 CIE color standard.

19. The substrate of claim 11 wherein a first suboxide barrier layer is directly over the first infrared-reflective film, and a second suboxide barrier layer is directly over the second infrared-reflective film, and wherein innermost portions of the first and second suboxide barrier layers are defined by suboxide film rather than metal film.

20. The substrate of claim 19 wherein the first and second suboxide barrier layers are directly beneath respective transparent dielectric layers.

21. The substrate of claim 11 wherein a titanium suboxide layer is directly over the second infrared-reflective layer, the second dielectric absorber film being directly over the titanium suboxide layer.

22. A transparent substrate bearing a solar control low-emissivity coating, the coating being a triple-type low-emissivity coating comprising, in sequence outwardly:
   a first absorber film comprising nitride, the first absorber film having a coefficient of extinction (k) at 550 nm of greater than 0.4;
   a first infrared-reflective film comprising silver;
   a first spacer coat, wherein the first spacer coat does not include any dielectric absorber film but rather consists essentially of transparent dielectric film;
   a second infrared-reflective film comprising silver;
   a second spacer coat, wherein the second spacer coat does not include any dielectric absorber film but rather consists essentially of transparent dielectric film;
   a third infrared-reflective film comprising silver; and
   a second absorber film comprising nitride, the second absorber film having a coefficient of extinction (k) at 550 nm of greater than 0.4;
   wherein the first and second absorber films both have a neutral absorption ratio of $k_{380<\lambda<450\ nm}/k_{650<\lambda<760\ nm}$ between 0.52 and 1.9.

23. The substrate of claim 22 wherein at least one of the first and second absorber films comprises a compound nitride including silicon nitride mixed with another nitride.

24. The substrate of claim 22 wherein both of the first and second absorber films comprise a compound nitride including silicon nitride mixed with at least one other nitride selected from the group consisting of titanium nitride, niobium nitride, zirconium nitride, chromium nitride, and nickel-chrome nitride.

25. The substrate of claim 22 wherein the first and second nitride absorber films both comprise titanium nitride and/or niobium nitride.

26. The substrate of claim 22 wherein first, second, and third suboxide barrier layers are directly over the first, second, and third infrared-reflective layers, respectively, and wherein innermost portions of the three suboxide barrier layers are formed by suboxide film rather than metal film.

27. The substrate of claim 26 wherein the three suboxide barrier layers are directly beneath respective transparent dielectric layers.

28. The substrate of claim 22 wherein a titanium suboxide layer is directly over the third infrared-reflective layer, the second nitride absorber film being directly over the titanium suboxide layer.

29. The substrate of claim 22 wherein the coated substrate has a monolithic visible transmittance of between 0.30 and 0.50.

30. The substrate of claim 22 wherein the coated substrate has a monolithic transmitted color characterized by the following color coordinates: 0.2<x<0.35, and 0.2<y<0.35, under 1931 CIE color standard.

31. The substrate of claim 30 wherein the monolithic transmitted color is characterized by the following color coordinates: $0.25<x<0.33$, and $0.25<y<0.33$, under 1931 CIE color standard.

32. The substrate of claim 1 wherein said transparent dielectric film has an extinction coefficient (k) at 550 nm of less than 0.1.

33. The substrate of claim 11 wherein said transparent dielectric film has an extinction coefficient (k) at 550 nm of less than 0.1.

34. The substrate of claim 22 wherein said transparent dielectric film has an extinction coefficient (k) at 550 nm of less than 0.1.

* * * * *